United States Patent [19]
Koketsu

[11] 3,826,018
[45] July 30, 1974

[54] VEHICLE WASHER
[75] Inventor: Shigeyoshi Koketsu, Fujinomiya, Japan
[73] Assignee: Yasui Sangyo Company Limited, Shizuoka-ken, Japan
[22] Filed: Feb. 9, 1973
[21] Appl. No.: 331,063

[52] U.S. Cl................................. 34/229, 34/243 C
[51] Int. Cl............................................ F26b 19/00
[58] Field of Search.......... 34/243 C, 222, 223, 229, 34/230, 239, DIG. 13; 15/DIG. 2, DIG. 7, 405; 134/123

[56] References Cited
UNITED STATES PATENTS
2,904,894  9/1959  Hurst................................... 34/229
3,279,093  10/1966  Dutton................................. 34/229
3,442,027  5/1969  Hurwitz............................... 34/229

Primary Examiner—Kenneth W. Sprague
Assistant Examiner—James C. Yeung
Attorney, Agent, or Firm—Richard Morganstern

[57] ABSTRACT

A vehicle washer having a top nozzle adapted to inject a flow of air against the upper surface of the vehicle body. The top nozzle is automatically adjusted in position relative to the configuration and height of the upper surface of the vehicle body.

6 Claims, 9 Drawing Figures

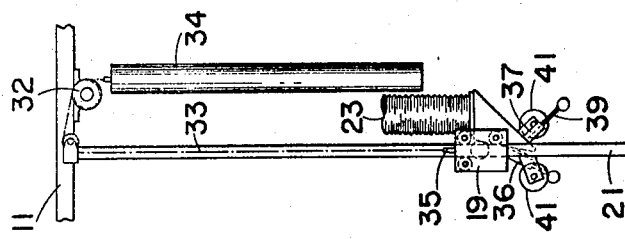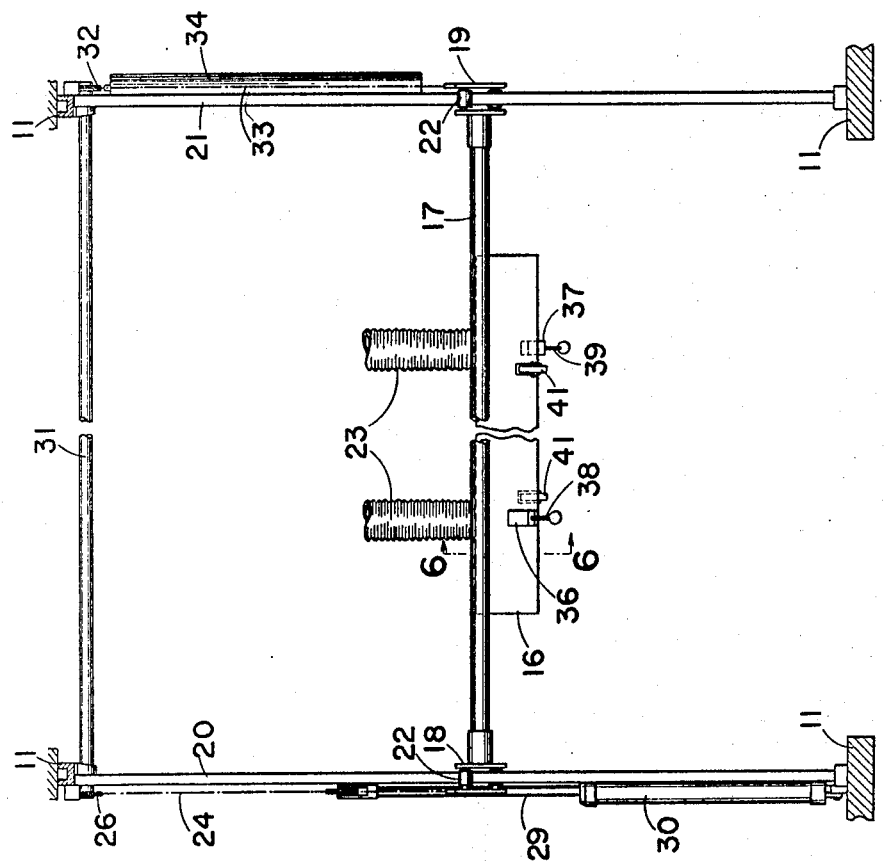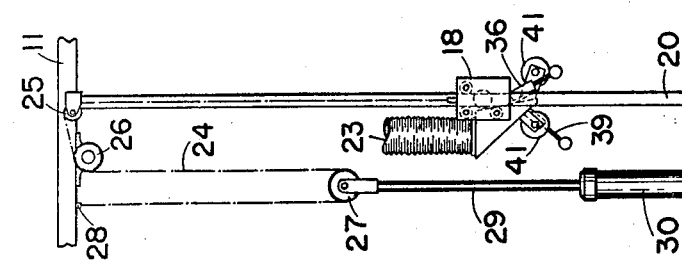

VEHICLE WASHER

This invention relates to a vehicle washer and more particularly to an apparatus for automatically holding an air nozzle at a proper position relative to the upper surface of the body of an automobile for drying the body surface after its washing operation.

Objects and advantages of the invention will be obvious herefrom, or may be learned by practice with the invention, the same being realized by means of the mechanism as pointed out in the appended claims.

The invention consists in the novel parts, constructions, arrangements, combination and improvements herein shown and described.

The accompanying drawings illustrate one embodiment of the invention, in which:

FIG. 3 is a vertical section on line 3—3 of FIG. 2;

FIG. 4 is a side elevation looking from the left side of FIG. 3;

FIG. 5 is a side elevation looking from the right side of FIG. 3;

Figure 1:
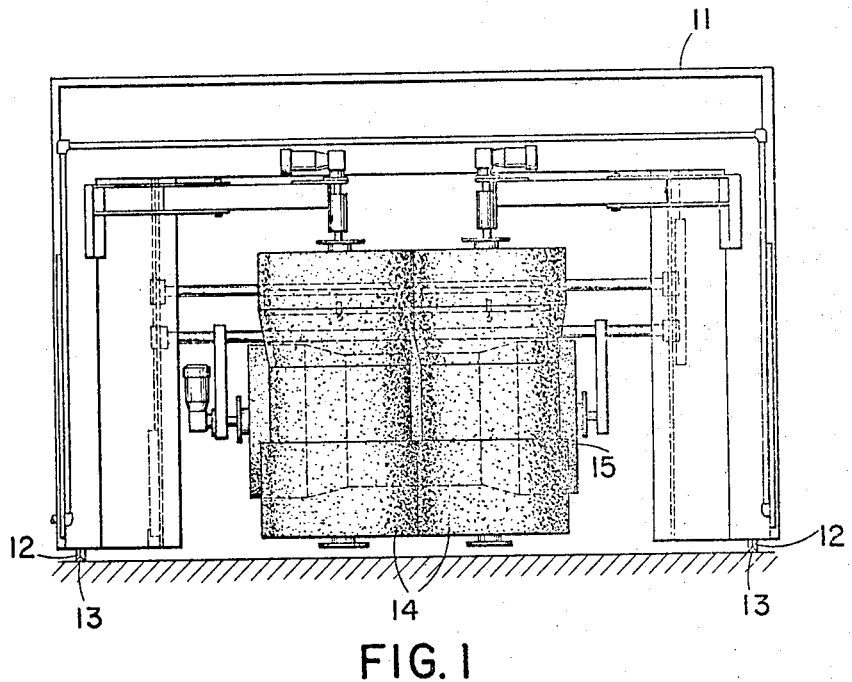
FIG. 1 is a front view of a vehicle washer equipped with the apparatus of the invention.
Figure 2:
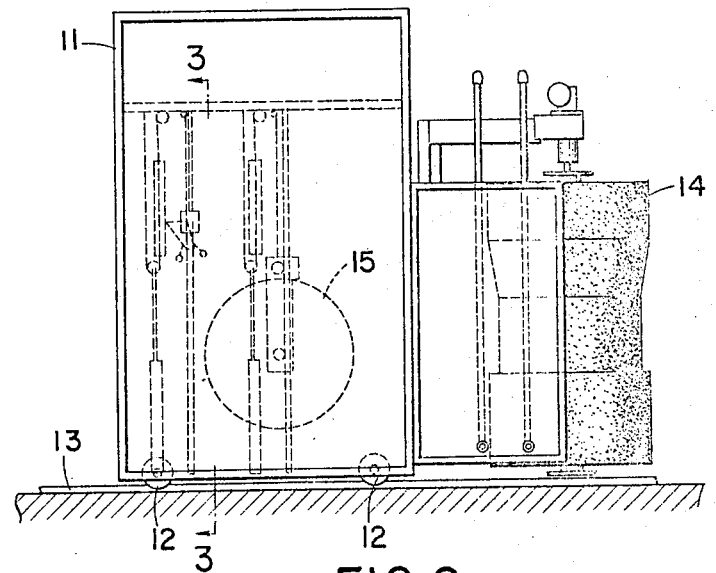
FIG. 2 is a side elevational view of the vehicle washer of FIG. 1.
Figure 6:
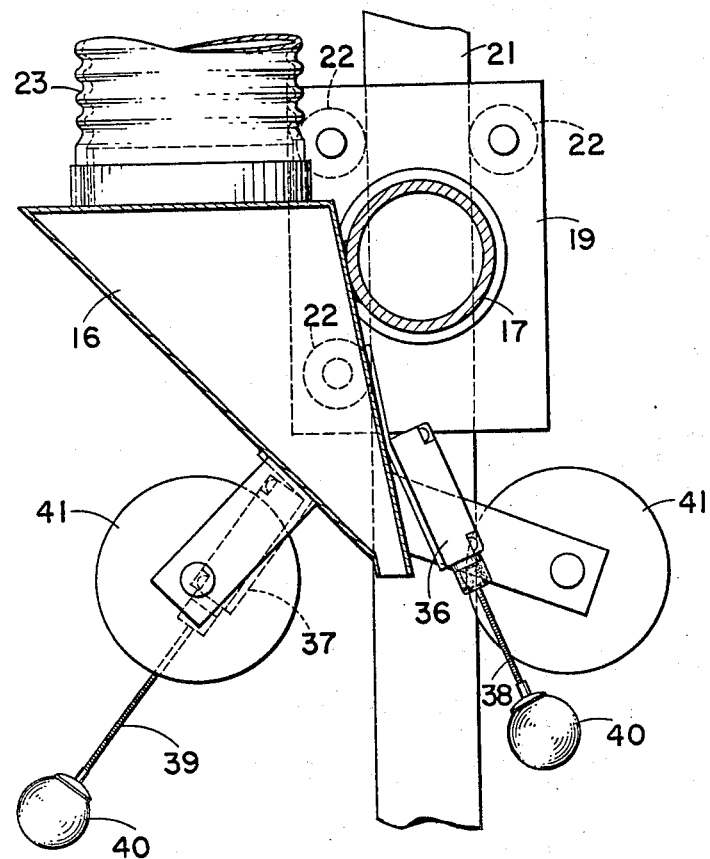
FIG. 6 is an enlarged view substantially taken on the line 6—6 of FIG. 3.
Figure 7:
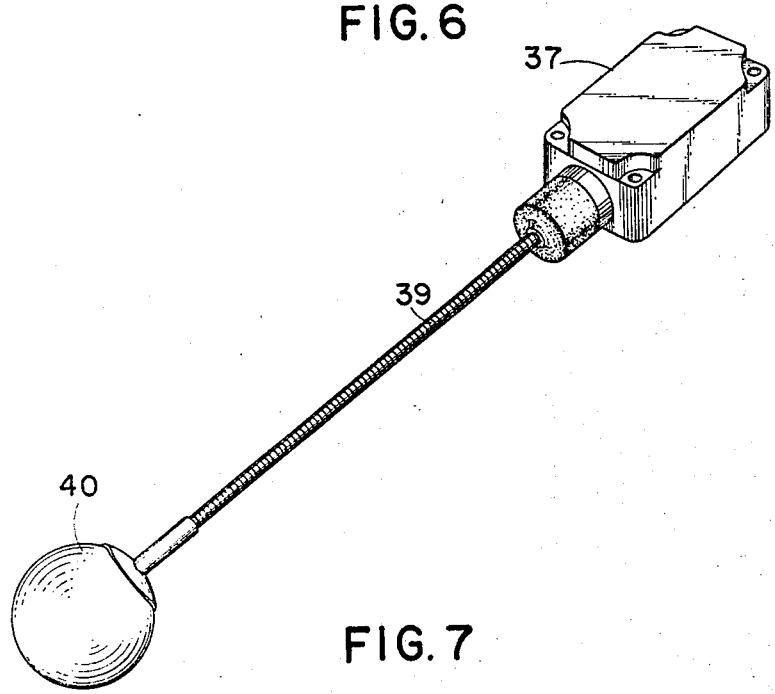
FIG. 7 is an enlarged perspective view of a feeler used in the apparatus of the invention.

In the drawings, numerical reference 11 is applied to a frame structure of the vehicle washer having wheels 12 and a drive mechanism (not shown) adapted to move the washer along rails 13 back and forth with respect to the body of the automobile being washed. In this connection, a pair of wrap-around brushes 14 and a top brush 15 are provided and arranged in such a manner that the brushes carry out their brushing operations on the side and top panels of the automobile body during the movement of the frame 11. These brushes and arrangements thereof are not important to provide an understanding of the present invention; hence their detailed explanation is omitted.

After completion of the brushing or washing of the automobile body, the whole surface of the body must be dried. The present invention is especially concerned with the drying of the upper surface of the automobile body.

The vehicle washer according to the present invention has a top nozzle 16 supported by a cross bar 17 extending between a pair of carrier blocks 18 and 19 which are movably mounted on vertical poles 20 and 21, respectively, by means of rollers 22. The vertical poles 20 and 21 are rigidly supported by the frame 11. Flexible ducts 23 connect the top nozzle 16 to a suitable source of compressed air.

One of the carrier blocks, i.e., the left block 18 in FIG. 3 is connected to an end of chain 24 which runs via a guide sprocket 25, a coupling sprocket 26 and a movable sprocket 27 and is anchored to the frame at 28. The movable sprocket 27 is pivoted to the upper end of a piston rod 29. Rod 29 extends vertically from a hydraulic cylinder 30 which stands on the frame 11. Thus, supply of oil pressure into the cylinder 30 causes the piston rod 29 to pull the movable sprocket 27. This in turn lifts the carrier block 18 as well as the cross bar 17 and the block 19 along the vertical poles 20 and 21. The sprocket 26 is coupled, through a transverse shaft 31, with a sprocket 32 which is rotatably mounted on the frame 11 at a position adjacent the upper end of the right pole 21 (FIG. 3). Engaged with the sprocket 32 is a chain 33 which is connected at an end thereof to a weight 34 and at the other end anchored to the right carrier block 19 at 35 (FIGS. 3 and 5). Obviously, the hydraulic power which is created in the cylinder 30 lifts the top nozzle 16 and allows the weight 34 to lower by gravity. It should be noted that the height 34 is preferably slightly lighter than the weight of the top nozzle assembly.

The top nozzle 16 is provided with a pair of limit switches 36 and 37 having actuator fingers 38 and 39, respectively, extending in opposite directions to each other. It should be noted that the fingers 38 and 39 extend in the form of an inverted V-shape as shown, i.e., the first finger 38 extends downwardly and forwardly relative to the automobile being washed (FIG. 8), while the second finger 39 extending downwardly and rearwardly relative to the automobile. It should be further noted that the first finger 38 is shorter than the second finger 39. Preferably the actuator fingers 38 and 39 are made from slightly flexible rods. Provided on the tip end of each of the fingers is a protector ball 40 for preventing the automobile body from being scratched by the actuator fingers. The top nozzle 16 is further provided on the lower end thereof with wheels 41 which are adapted to protect the automobile body from the top nozzle.

Figure 9:
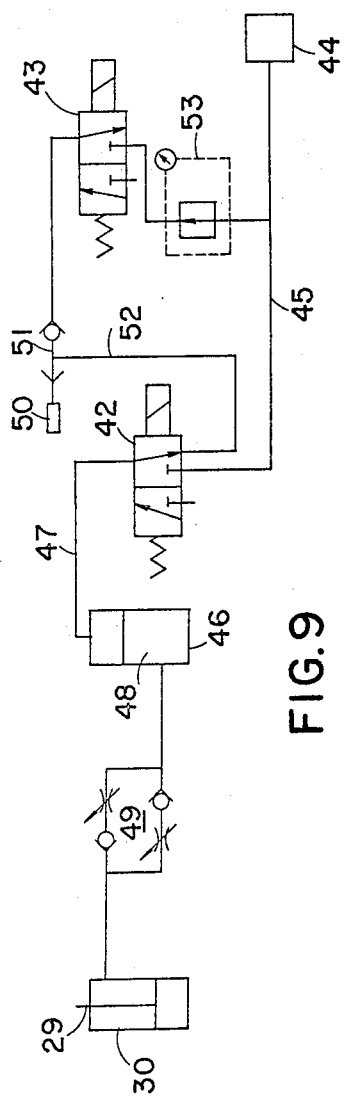
FIG. 9 is a diagram of the fluid pressure circuits used in conjunction with the apparatus of the invention.
Figure 8:
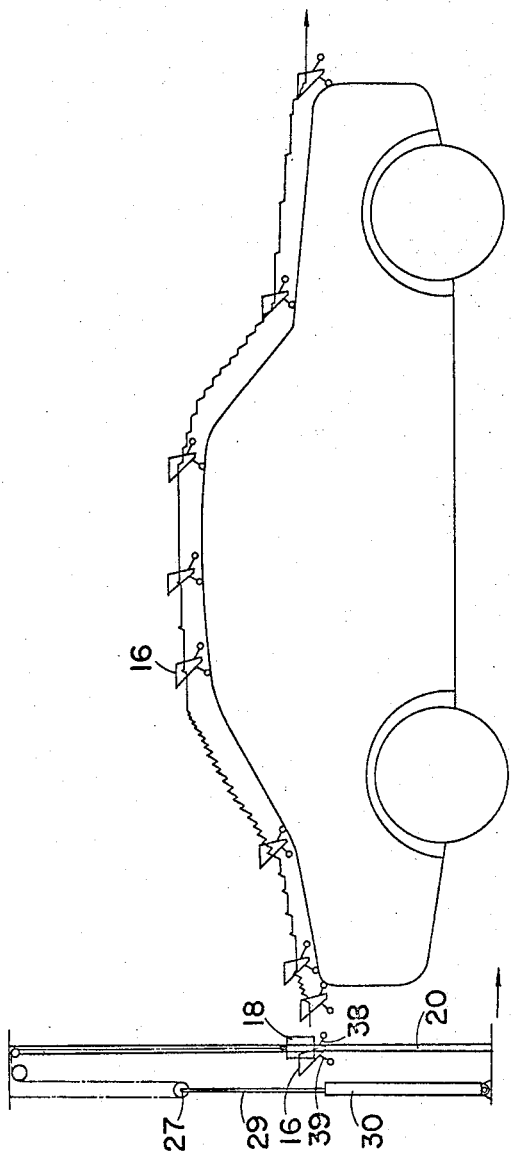
FIG. 8 illustrates a cycle of operation of a top nozzle according to the invention.

In operation, the vehicle washer is driven to move to the right in FIG. 8 so that the first finger 38 engages the body of the automobile. The diagrammatic layout of the fluid circuits in FIG. 9 shows how the connections are made. FIG. 9 shows the connections when the apparatus has started its air jeting operation but before the first finger 38 engages the automobile body. The fluid circuits include two spool valves 42 and 43 which are operated by the fingers 38 and 39, respectively. Engagement of the first finger 38 with the automobile body actuates the first limit switch 36 to operate the spool of the first valve 42 to move to a second or right position from its first or left position as seen in FIG. 9. Thus the inlet port of the valve 42 connects to a suitable source of compressed air 44 through a passage 45. At the same time the outlet port of the valve 42 is connected to a hermetically sealed chamber 46 through a passage 47. Thus the air pressure which is developed in the chamber 46, acts on the level of oil 48 in the chamber, resulting in supplying the oil under pressure to the cylinder 30 through a check valve and throttle valve assembly 49. Thus the oil pressure in the cylinder 30 will drive the piston rod 29 to move downwardly. This results in lifting the top nozzle assembly against the force of gravity.

As the top nozzle assembly is lifted, the first finger 38 disengages from the automobile body and accordingly the first limit switch 36 switches to its original state. The spool of first valve 42 returns to its first position as seen in FIG. 9. When the spool of first valve 42 is positioned at the first position, the passage 47 is connected to a relief port 50 through a double check valve 51 and a passage 52. Therefore, the air pressure in the chamber 46 is discharged to the atmosphere from the release port 50, allowing the top nozzle 16 to lower by gravity until the first ginger 38 engages the automobile body. When the finger 38 engages the automobile body again, the top nozzle 16 will be driven to move upwardly as described above. In this way, the top nozzle 16 repeats its up and down movements in conformity to the configuration of the upper surface of the automobile body.

When the top nozzle 16 comes to a flat surface such as the roof as shown in FIG. 8 and the nozzle descends from its raised-up position, the second and longer finger 39 engages the automobile body and actuates the second limit switch 37. This operates the spool of the second valve 43 to cause it to move to a second or right position from its first or left position as seen in FIG. 9. As shown in FIG. 9, the passage 45 from the source of compressed air 44 is connected to the second spool valve 43 through a reducing valve 53. Therefore, a reduced air pressure is then supplied to the chamber 46 through the second spool valve 43. The reducing valve 53 is adjusted such that the air pressure balances with the force of gravity of the top nozzle assembly. Therefore the top nozzle 16 will remain at a predetermined position above the automobile body. Weight 34 is used to lessen the gravitational descending force of the top nozzle assembly.

Thus the top nozzle 16 can be retained always at a proper position as a function of the height and configuration of the upper surface of the automobile body.

Although in the illustrated embodiment the frame 11 is arranged movably along the rail, it may be designed to remain stationary, with provision being made for the automobile to be moved instead.

I claim:

1. In a vehicle washer, an apparatus for automatically adjusting the position of an air dryer relative to the upper surface of the vehicle body comprising a frame structure, a cross bar movably mounted on said frame structure, an air injection nozzle supported by said cross bar, said frame structure and said cross bar normally supporting said nozzle in a lowermost biased position, first and second feeler means mounted on said nozzle, each of said feeler means having a finger extending below said nozzle and adapted to engage the vehicle body, and switch means adapted to operate a fluid-operated device, said fingers being arranged such that they extend oppositely with respect to each other and such that one of said fingers extends in front of said nozzle and in the direction of relative motion of said cross bar with respect to the upper surface of the vehicle body, said one finger being positioned higher than the other finger, said one finger being capable of operating said fluid-operated device for lifting said nozzle, and such that said other finger being capable of operating said fluid-operated device for adjustably lifting said nozzle so as to retain the height of the nozzle at a fixed position with respect to the upper vehicle body surface proximate the nozzle.

2. In a vehicle washer system for adjusting the position of an air dryer relative to the upper surface of the vehicle body, the combination comprising:
an air injection nozzle;
nozzle mounting means for positioning the air injection nozzle for relative motion with respect to the upper surface of the vehicle body, said nozzle mounting means normally supporting said nozzle in a lowermost biased position;
first and second feeler means positioned on said nozzle, said first and second feeler means having first and second extension members, respectively, each adapted to engage the upper surface of the vehicle body, said first extension member being positioned higher than said second extension member and extending in front of said nozzle and in the direction of relative motion of said nozzle with respect to said vehicle body, said second extension member extending in the direction opposite said first extension member;
first nozzle positioning means response to said first extension member engaging the vehicle body for lifting said nozzle with respect to the vehicle body; and
second nozzle positioning means responsive to said second extension member engaging the vehicle body for maintaining said nozzle at a fixed height with respect to the vehicle body.

3. The combination as claimed in claim 2 wherein said nozzle mounting means comprises:
a frame structure,
a cross bar movably mounted on said frame structure, said nozzle mounting means including means for supporting said nozzle on said cross bar.

4. The combination as claimed in claim 3 wherein said first and second extension members comprise first and second elongated fingers.

5. The combination as claimed in claim 4 further comprising:
first and second switches adapted to be respectively actuated by said first and said second fingers responsive to said fingers engaging the vehicle body.

6. The combination of claim 5 wherein said first nozzle positioning means is responsive to actuation of said first switch and said second nozzle positioning means is responsive to actuation of second switch.

* * * * *